(12) United States Patent
Kobayashi et al.

(10) Patent No.: US 11,893,417 B2
(45) Date of Patent: Feb. 6, 2024

(54) PROCESS REQUEST MANAGEMENT APPARATUS, PROCESS REQUEST MANAGEMENT METHOD AND PROGRAM

(71) Applicant: Nippon Telegraph and Telephone Corporation, Tokyo (JP)

(72) Inventors: Masahiro Kobayashi, Tokyo (JP); Shigeaki Harada, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 296 days.

(21) Appl. No.: 17/291,698

(22) PCT Filed: Nov. 5, 2019

(86) PCT No.: PCT/JP2019/043238
§ 371 (c)(1),
(2) Date: May 6, 2021

(87) PCT Pub. No.: WO2020/100652
PCT Pub. Date: May 22, 2020

(65) Prior Publication Data
US 2022/0004432 A1      Jan. 6, 2022

(30) Foreign Application Priority Data
Nov. 14, 2018   (JP) ................ 2018-213981

(51) Int. Cl.
*G06F 9/46*      (2006.01)
*G06F 9/48*      (2006.01)
*G06F 9/50*      (2006.01)

(52) U.S. Cl.
CPC .......... *G06F 9/4887* (2013.01); *G06F 9/5005* (2013.01)

(58) Field of Classification Search
CPC ............................ G06F 9/4887; G06F 9/5005
See application file for complete search history.

(56) References Cited

U.S. PATENT DOCUMENTS

| | | | |
|---|---|---|---|
| 6,675,190 B1 * | 1/2004 | Schabernack | G06F 9/4881 718/102 |
| 2018/0373562 A1 * | 12/2018 | Roberts | G06F 9/4887 |
| 2019/0303196 A1 * | 10/2019 | Song | G05B 19/41865 |

FOREIGN PATENT DOCUMENTS

| | | |
|---|---|---|
| JP | 5513999 | 6/2014 |
| JP | 2014-178801 | 9/2014 |
| JP | 2015-170180 | 9/2015 |

OTHER PUBLICATIONS

Matsuo, "Operating system," Morikita Publishing Co., Ltd., Oct. 28, 2005, 29 pages (with English Translation).

* cited by examiner

*Primary Examiner* — Gregory A Kessler
(74) *Attorney, Agent, or Firm* — Fish & Richardson P.C.

(57) ABSTRACT

A processing request management apparatus includes: an estimation unit which estimates a time required for processing for each of a plurality of processing requests for which desired processing completion times are designated; and a determination unit which determines an execution order of processing for the plurality of processing requests such that a sum of delays of estimated processing completion times based on the required time with respect to the desired processing completion times for the respective processing requests in the plurality of processing requests is minimized, to increase a likelihood of restrictions with respect to processing requests being satisfied.

9 Claims, 9 Drawing Sheets

PROCESS REQUEST MANAGEMENT APPARATUS, PROCESS REQUEST MANAGEMENT METHOD AND PROGRAM

CROSS-REFERENCE TO RELATED APPLICATIONS

This application is a National Stage application under 35 U.S.C. § 371 of International Application No. PCT/JP2019/043238, having an International Filing Date of Nov. 5, 2019, which claims priority to Japanese Application Serial No. 2018-213981, filed on Nov. 14, 2018. The disclosure of the prior application is considered part of the disclosure of this application, and is incorporated in its entirety into this application.

TECHNICAL FIELD

The present invention relates to a processing request management apparatus, a processing request management method, and a program.

BACKGROUND ART

With the progress of virtualization technology, the application range of the virtualization technology has extended to the field of communication networks as well as the field of cloud computing, and virtualization is progressing even in commercial networks. In a virtualized communication network, a control device called an orchestrator or a controller controls network devices in an integrated manner. When a network user wants to perform an operation such as new establishment (new opening), change or abolition of a service in a network, he/she inputs an order to the control device. Since a long processing time is required depending on the type of an order, processing of the control device is not performed in time and orders are in a standby state when a plurality of orders are issued. The control device executes processing with respect to a standby order at a point in time when processing under execution ends.

In execution of orders with respect to a service of a virtualized network, execution restrictions on each order need to be considered. Here, a processing completion time limit restriction and an execution order restriction are conceivable as the execution restrictions. The processing completion time limit restriction is an execution restriction in which processing must be completed by a time that an order issuer desires. Since desired processing completion times are considerably different for an order having a high real-time property (e.g., a service change due to a failure) and an order that does not (e.g., a new service opening after several days), processing order needs to be changed in response to time limits.

On the other hand, the execution order restriction is an execution restriction in which an execution order of orders for a certain service should not be changed. It is assumed that an order for a new opening of a certain service is input and an order for changing the service is input immediately after the order for the new opening. When the execution order of these orders is reversed, an order for changing a non-existent service is executed, which results in processing that is not intended by a person who inputs the order.

It is required to minimize the number of orders that violate the execution restrictions (processing completion time limit and execution order restrictions) because the execution restrictions should be protected as long as possible. As means for minimizing the number of orders that violate the execution restrictions, "order change of orders in consideration of execution restrictions" and "combination of redundant orders" are conceived.

CITATION LIST

Patent Literature

[PTL 1] Japanese Patent No. 5513999

Non Patent Literature

[NPL 1] Matsuo Hiroshi, "Operating System," Morikita Publishing Co., Ltd., 2005, [online], Internet <URL: http://www.matlab.nitech.ac.jp/-matsuo/OS/OS03.pdf>

SUMMARY OF THE INVENTION

Technical Problem

With respect to order change of orders, there are typical scheduling techniques such as a first in first out (FIFO) method, a priority scheduling (PS) method, and a shortest processing time first (SPTF) method as conventional technologies (Non-Patent Literature 1). The FIFO method is a method of extracting orders from a queue in the order of arrival at the queue. The PS method is a method of assigning priorities to orders and extracting an order with highest priority in a queue. The SPTF method is a method of extracting an order having a shortest estimate of a processing time in a queue. In these conventional technologies, it is difficult to perform order change in consideration of execution restrictions (processing completion time limit and execution order restrictions).

In addition, with respect to combination of orders, a technology for merging redundant orders from among standby orders has been proposed (Patent Literature 1). When redundant orders are combined, a likelihood of orders being executed within a desired processing completion time limit increases because processing time of originally unnecessary orders can be allocated to processing of other orders. However, since this technology is targeted for input of orders to a network device, it is difficult to combine orders of a virtualized network.

As described above, it is difficult to minimize the number of orders that violate execution restrictions in conventional technologies.

An object of the present invention devised in view of the aforementioned point is to increase a likelihood of restrictions with respect to processing requests being satisfied.

Means for Solving the Problem

Accordingly, to solve the aforementioned problems, a processing request management apparatus includes an estimation unit which estimates a time required for processing for each of a plurality of processing requests for which desired processing completion times are designated, and a determination unit which determines an execution order of processing for the plurality of processing requests such that a sum of delays of estimated processing completion times based on the required time with respect to the desired processing completion times for the respective processing requests in the plurality of processing requests is minimized.

Effects of the Invention

It is possible to increase a likelihood of restrictions with respect to processing requests being satisfied.

DESCRIPTION OF EMBODIMENTS

Hereinafter, an embodiment of the present invention will be described on the basis of drawings. The present embodiment discloses an order management apparatus 10 which solves "minimization of the number of orders that violate execution restrictions" by realizing "change of order of orders in consideration of execution restrictions" and "combination of redundant orders" with respect to orders relating to a service of a virtualized communication network (hereinafter referred to as "virtualized network"). Meanwhile, orders relating to a service may be, for example, processing requests indicating new establishment (new opening), change or abolition of the service. A new opening of a service is an opening (establishment) of a new service in a virtualized network. An opening of a service means receiving, from a virtualized network, allocation of resources corresponding to components (a fire wall (FW), a load balancer (LB), and various servers such as a web server) of the service. Meanwhile, an ordered combination of components of a service is referred to as a "service configuration". Since an order relation is present between servers in a service, a service configuration is an ordered combination of components of the service. Change of a service means changing a service configuration. Abolition of a service means releasing resources allocated to the service in a virtualized network.

In the present embodiment, "change of order of orders for satisfying execution restrictions (processing completion time limit restriction and execution order restriction)" is realized through the following method.

For satisfaction of the processing completion time limit restriction, a system (order request apparatus 20 which will be described later) which requests an order assigns a desired processing completion time to the order. Further, for satisfaction of the processing completion time limit restriction, an execution order of standby orders is changed such that a total value of "differences between desired processing completion times and estimated processing completion times in respective orders" is maximized. That is, a delay of an estimated processing completion time with respect to a desired processing completion time of each order is calculated for all standby orders and an execution order of the standby orders is changed such that a total value of the delays is minimized.

For satisfaction of the execution turn restriction, the same processing label is assigned to orders with respect to an order group in which reversal of the execution order (reversal of order reception turns) is not permitted. Further, for satisfaction of the execution turn restriction, an order is not changed for an order group to which the same processing label is assigned (reception turns are maintained).

For "combination of redundant orders", orders are combined into one such that the content of each order is reflected when a plurality of orders for the same standby service are present. Meanwhile, a processing time of the entire combined order group is expected to decrease as compared to that before being combined according to combination of orders. Since the decreased processing time can be allocated to processing with respect to other orders, a likelihood of the processing completion time limit restriction being satisfied increases.

Figure 1:
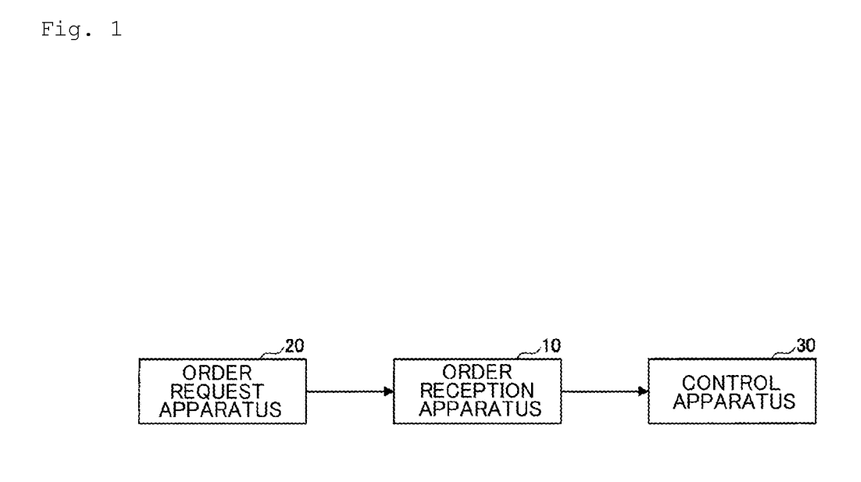
FIG. 1 is a diagram showing a configuration example of an order management system in an embodiment of the present invention.

FIG. 1 is a diagram showing a configuration example of an order management system in an embodiment of the present invention. In FIG. 1, the order management system includes the order request apparatus 20, the order management apparatus 10, and a control apparatus 30.

The order request apparatus 20 is one or more computers that request orders. The order management apparatus 10 is one or more computers that receive an order requested by the order request apparatus 20 and transmit the order to the control apparatus 30. The control apparatus 30 is one or more computers that execute orders. For example, an orchestrator, a controller, or the like may be used as the control apparatus 30. Meanwhile, the order request apparatus 20, the order management apparatus 10, and the control apparatus 30 may be realized using a common computer.

Figure 2:
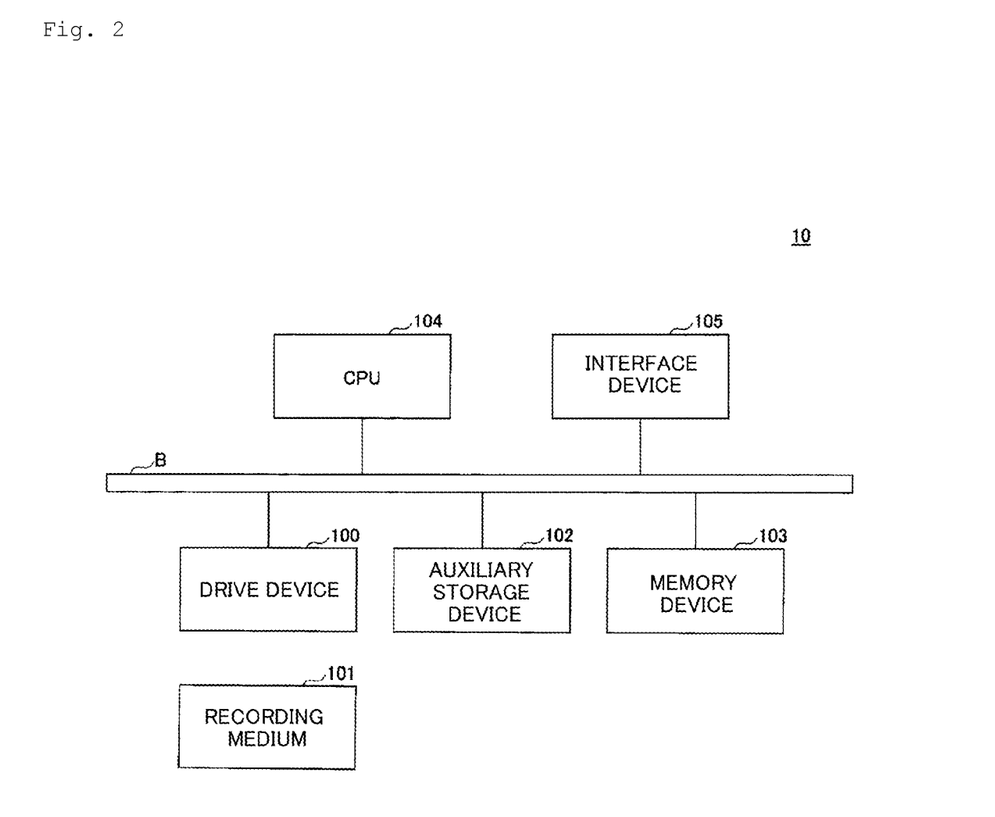
FIG. 2 is a diagram showing a hardware configuration example of an order management apparatus 10 in an embodiment of the present invention.

FIG. 2 is a diagram showing a hardware configuration example of the order management apparatus 10 in an embodiment of the present invention. The order management apparatus 10 of FIG. 2 includes a drive device 100, an auxiliary storage device 102, a memory device 103, a CPU 104, an interface device 105, and the like which are connected through a bus B.

A program that realizes processing in the order management apparatus 10 is provided on a recording medium 101 such as a CD-ROM. When the recording medium 101 storing the program is set in the drive device 100, the program is installed from the recording medium 101 to the auxiliary storage device 102 via the drive device 100. However, installation of the program is not necessarily performed by the recording medium 101, and the program may be downloaded by another computer via a network. The auxiliary storage device 102 stores the installed program and stores necessary files, data, and the like.

The memory device 103 reads the program from the auxiliary storage device 102 and stores the program when there is a program starting instruction. The CPU 104 executes functions pertaining to the order management apparatus 10 according to the program stored in the memory device 103. The interface device 105 is used as an interface for connection to a network.

Figure 3:
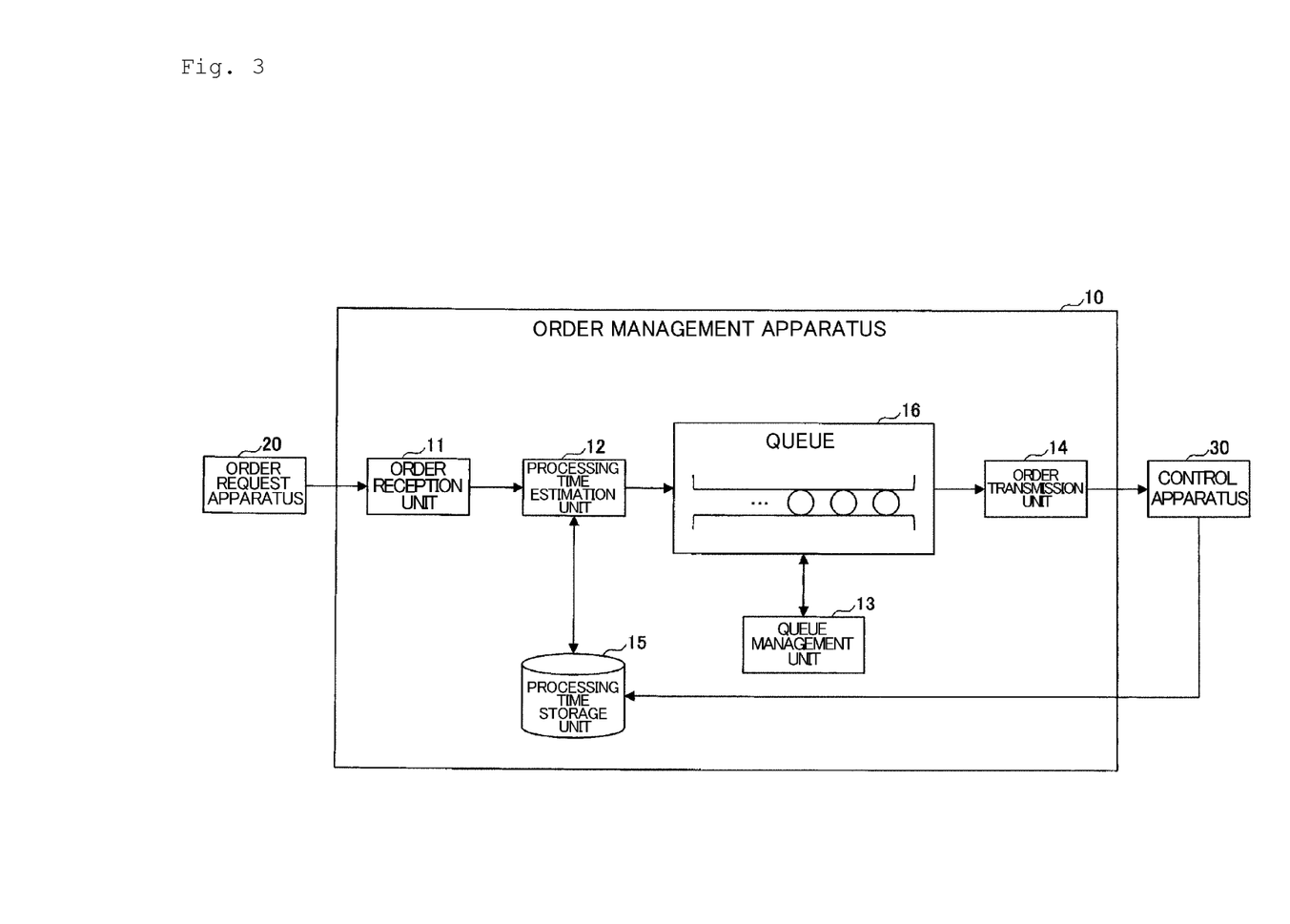
FIG. 3 is a diagram showing a functional configuration example of the order management apparatus 10 in an embodiment of the present invention.

FIG. 3 is a diagram showing a functional configuration example of the order management apparatus 10 in an embodiment of the present invention. In FIG. 3, the order management apparatus 10 includes an order reception unit 11, a processing time estimation unit 12, a queue management unit 13, an order transmission unit 14, and the like. These components are realized by processing executed by the CPU 104 according to one or more programs installed in the order management apparatus 10. However, the components may be distributed to a plurality of computers. In addition, the order management apparatus 10 uses a processing time storage unit 15 and a queue 16. Storage units such as the processing time storage unit 15 and the queue 16 can be realized, for example, using the auxiliary storage device 102, the memory device 103, or the like.

The order reception unit 11 accepts (receives) orders in turns from the order request apparatus 20. The processing time estimation unit 12 estimates processing times on the basis of the content of the orders. The processing time estimation unit 12 assigns the estimated processing times to the orders and registers the orders in the queue 16 in turns of the orders received by the order reception unit 11. The processing time storage unit 15 associates the content of orders processed in the past with processing times and stores the associated content and processing times. Orders on standby for execution are accumulated in the queue 16. The queue management unit 13 performs determination of an execution order of orders in the queue 16 and combination of orders. The order transmission unit 14 extracts an order in the queue 16 and transmits the extracted order to the control apparatus 30.

Figure 4:
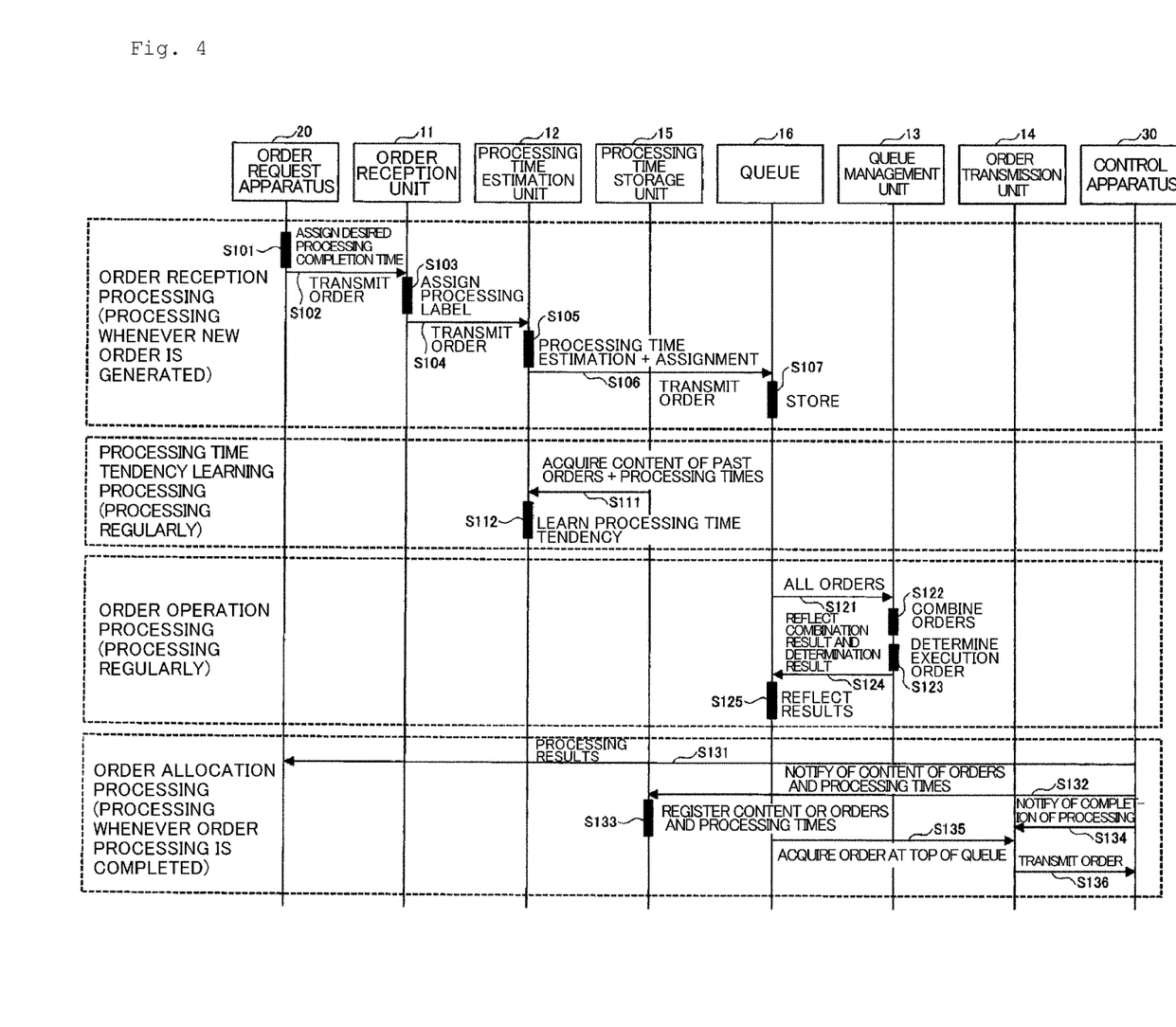
FIG. 4 is a diagram showing an example of a processing procedure executed in the order management system.

Hereinafter, a processing procedure executed in the order management system will be described. FIG. 4 is a diagram showing an example of a processing procedure executed in the order management system. The processing procedure of FIG. 4 includes four processes: order reception processing, processing time tendency learning processing, order operation processing, and order allocation processing. Hereinafter, the processes will be described in order.

[Order reception processing]

When a new order (hereinafter referred to as a "target order") is generated in the order request apparatus 20, the order request apparatus 20 assigns a desired processing completion time to the target order (S101) and transmits the target order to the order management apparatus 10 (S102).

Figure 5:
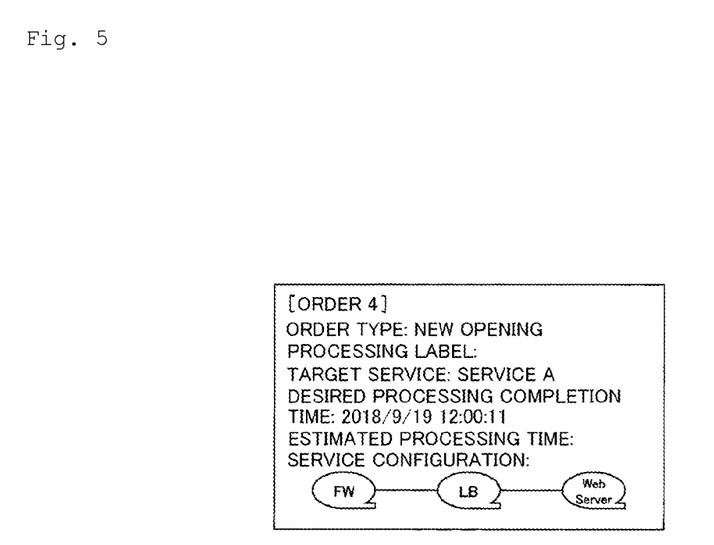
FIG. 5 is a diagram showing an example of the content of an order.

FIG. 5 is a diagram showing an example of the content of an order. As shown in FIG. 5, an order includes items such as an order ID, an order type, a processing label, a target service, a desired processing completion time, an estimated processing time, and a service configuration in the present embodiment.

The order ID is identification information of each order. In FIG. 5, a character string ("order 4") in [ ] is the order ID. The order type is the type of an order. In the present embodiment, the order type is any of "new opening", "service change" and "service abolition". The processing label is an item for identifying an order group for which reversal of an execution order with respect to reception turns is not permitted. At this point in time, the processing label is not assigned to the order, and thus the value of the processing label is vacant in FIG. 5. The desired processing completion time is a completion time of processing corresponding to the order which is desired by an order requester. The estimated processing time is an estimate of a time required for processing corresponding to the order. At this point in time, the estimated processing time has not been calculated, and the value of the estimated processing time is vacant in FIG. 5. The service configuration is a service configuration of a target service. The example of FIG. 5 shows that the target service is composed of a firewall (FW), a load balancer (LB) and a web server (WebServer). That is, the order of FIG. 5 is an order requesting a new opening of the service having this service configuration.

When the order reception unit 11 of the order management apparatus 10 receives the target order, the order reception unit 11 assigns a processing label to the target order on the basis of a processing label assignment rule set in the order reception unit 11 in advance (S103) and forwards the target order to the processing time estimation unit 12 (S104). The processing label is an item for identifying an order group for which reversal of an execution order is not permitted. Accordingly, the processing label may be a character string or a numerical value as long as it is identification information by which an order group for which execution order reversal is not permitted can be identified. In the present embodiment, an assignment rule in which the same identification information is assigned to an order group for which execution order reversal is not permitted as a processing label is employed. For example, there are many cases in which execution order reversal cannot be permitted with respect to orders for the same service, and thus a fixed processing label may be determined in advance for each service. In this case, the order reception unit 11 assigns a label to be assigned which corresponds to a target service of the target order to the target order. In addition, with respect to orders for which order execution order reversal cannot be permitted in a plurality of services, an assignment rule may be set such that the same processing label is assigned in the plurality of services.

Figure 6:
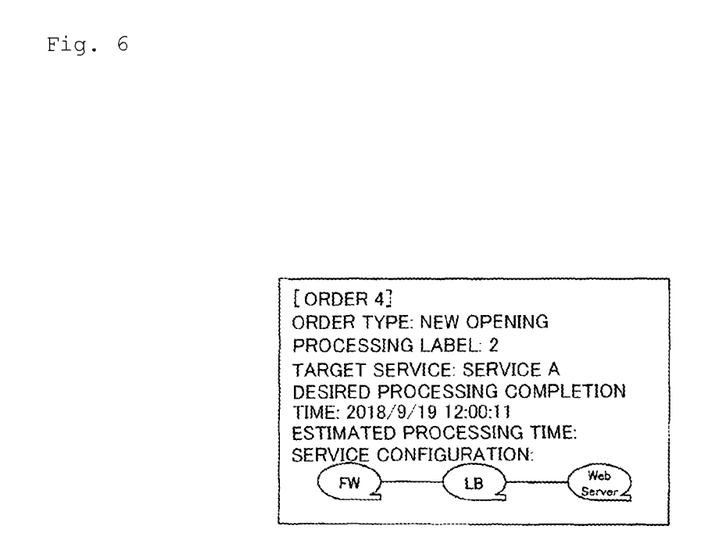
FIG. 6 is a diagram showing an example of an order to which a processing label has been assigned.

FIG. 6 is a diagram showing an example of an order to which a processing label has been assigned. FIG. 6 shows an example in which an assignment rule in which a processing label corresponding to "service A" is "2" is set. Accordingly, "2" is assigned to the order shown in FIG. 6 as a processing label.

Subsequently, the processing time estimation unit 12 assigns the estimated processing time to the target order on the basis of a learning result in processing time tendency learning processing which will be described later (S105). Subsequently, when the processing time estimation unit 12 transmits the target order to the queue 16 (S106), the target order is stored in the queue 16 (S107).

[Processing time tendency learning processing]

The processing time estimation unit 12 acquires the content and processing time of each past order from the processing time storage unit 15 every specific time (S111) and learns tendencies of processing content and processing times (S112). By doing so, real-time estimation of processing time in step S105 in order reception processing can be performed.

Figure 7:
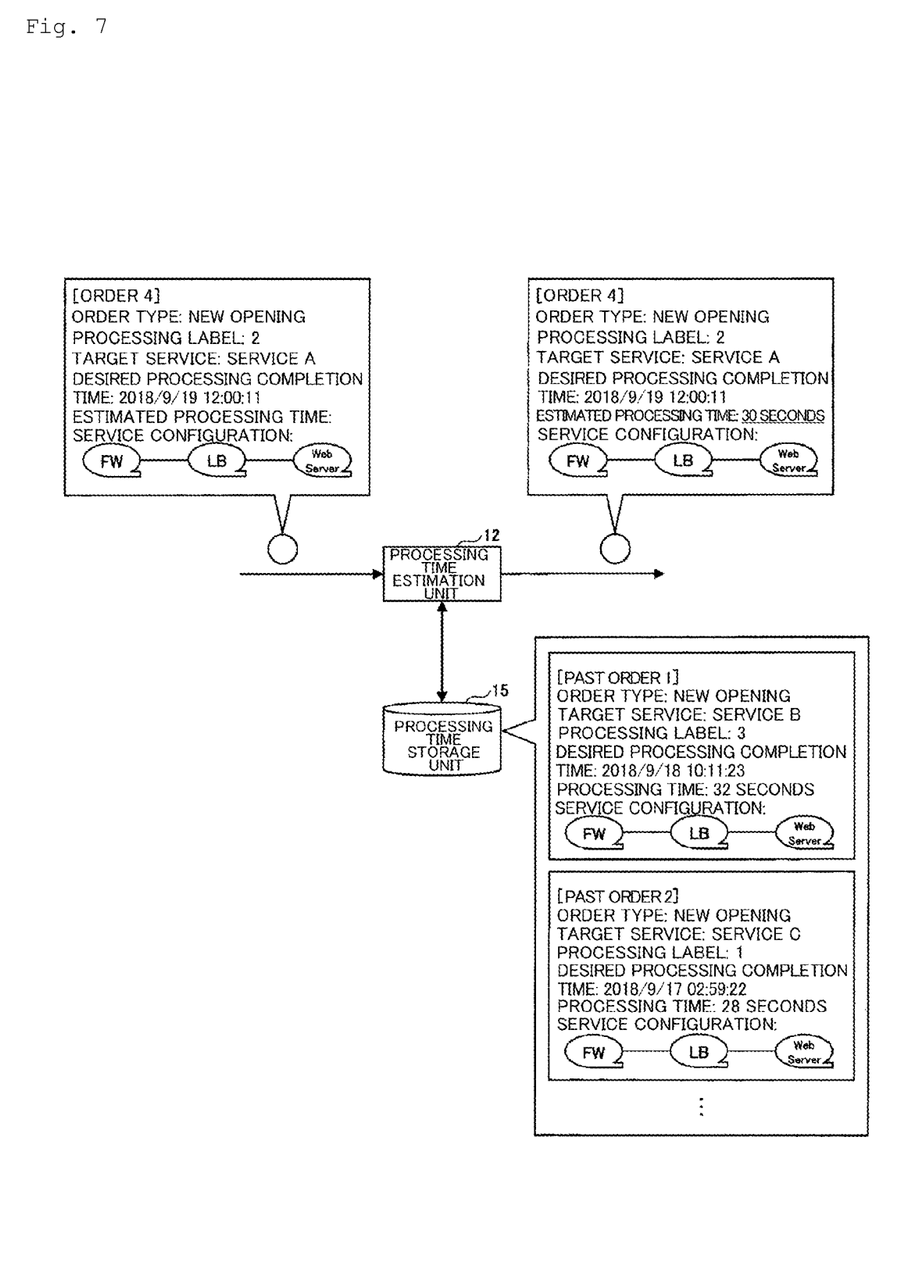
FIG. 7 is a diagram for describing an example of learning of a tendency of processing time.

FIG. 7 is a diagram for describing an example of learning of a processing time tendency. For example, the processing time estimation unit 12 groups (classifies) past orders stored in the processing time storage unit 15 on the basis of commonality of service types and service configurations. That is, an order group having the same service type and service configuration is classified as the same group. This is because it is conceivable that processing times highly tend to be similar with respect to an order group having a common service type and service configuration in the present embodiment.

The processing time estimation unit 12 calculates an average of processing times of orders belonging to a corresponding group for each group. That is, (actual values of)

processing times instead of estimated processing times have been recorded in past orders that have already been executed. FIG. 7 shows an example in which past order 1 and past order 2 belong to a group having a service type of "new opening" and a service configuration of "FW-LB-WebServer" and processing times of the past orders are 32 seconds and 28 seconds. The processing time estimation unit 12 calculates an average of these past orders as an estimated processing time of the group. In step S105, the processing time estimation unit 12 assigns an estimated processing time calculated for a group including the target order to the target order.

Meanwhile, orders similar to the target order may be specified through methods other than the aforementioned method. For example, it is possible to efficiently and automatically learn grouping of similar orders and a tendency of processing times for each similar group by using machine learning, deep learning, or the like.

[Order Operation Processing]

The queue management unit 13 acquires all orders in the queue 16 every specific time (S121). Subsequently, the queue management unit 13 specifies redundant order groups on the basis of the content of respective acquired orders and combines the order groups (S122). A redundant order group is an order group for which some processing is common (redundant), for example. In the present embodiment, an example in which an order group having the same processing label and service type is a redundant order group is described.

Figure 8:
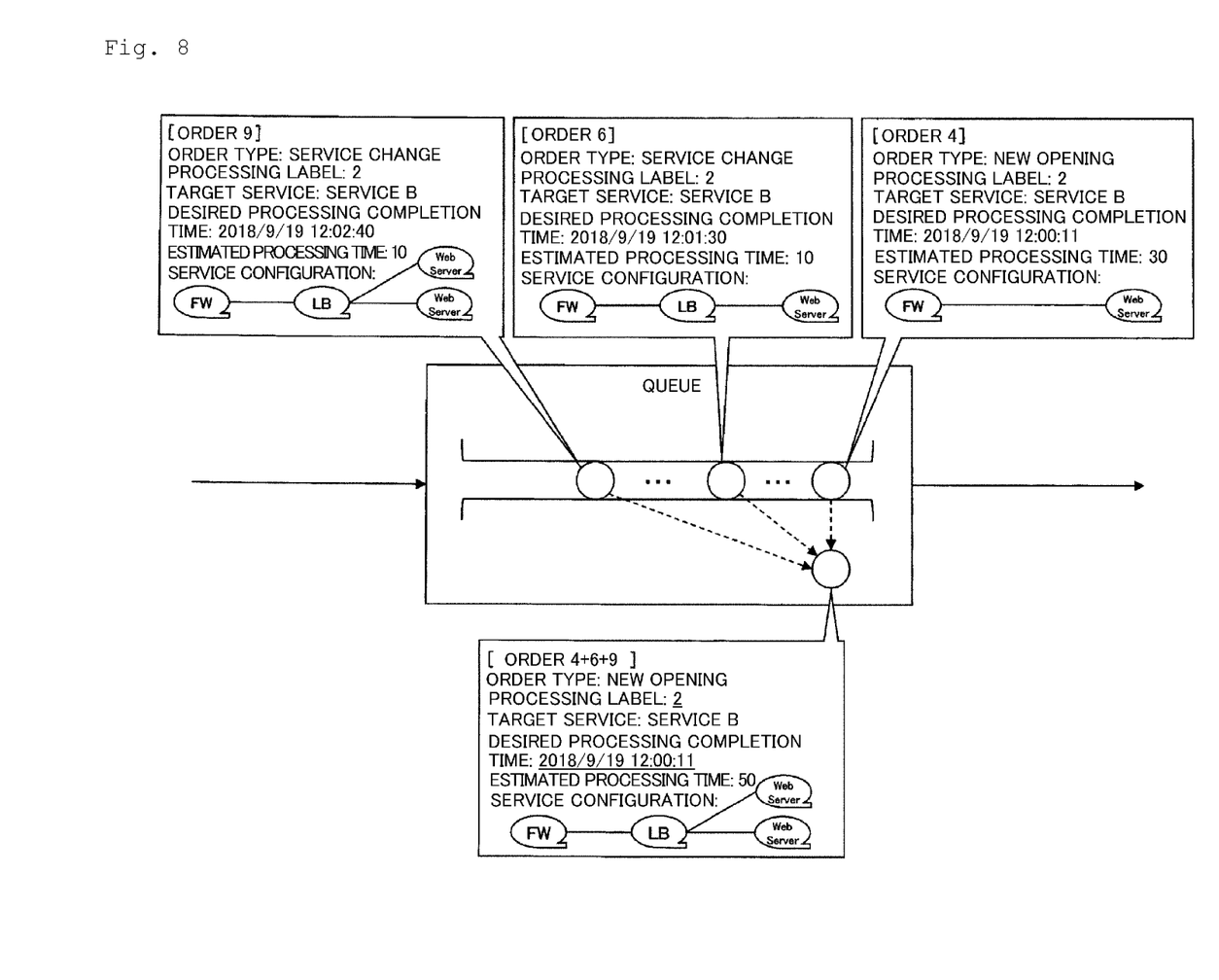
FIG. 8 is a diagram for describing an example of order combination.

FIG. 8 is a diagram for describing an example of order combination. FIG. 8 shows an example in which order 9, order 6, order 4, and the like are parts of an order group accumulated in the queue 16. A processing label of order 9, order 6 and order 4 is "2" and a target service is "service B". Accordingly, order 9, order 6 and order 4 correspond to a redundant order group in the present embodiment. Meanwhile, one of these orders is a new opening order and two are service change orders.

The queue management unit 13 combines the three orders into one order (order 4+6+9) such that the content of these orders is reflected. Here, the queue management unit 13 sets an order type of the combined orders (hereinafter referred to as "combined orders") to "new opening" that is the order type of the leading order (order 4) among the three orders and sets a service configuration thereof to the service configuration of the end order (order 9) among the three orders. In addition, the queue management unit 13 sets a processing label of the combined orders to the value of the common processing label of the respective orders before being combined, sets a desired processing completion time of the combined orders to an earliest time among desired processing completion times of the respective orders before being combined, and sets an estimated processing time of the combined orders to the sum of estimated processing times of the respective orders before being combined. However, the estimated processing time of the combined orders may be re-estimated again by the processing time estimation unit 12 on the basis of the content of the combined orders. In addition, the queue management unit 13 sets an execution turn (a position in the queue 16) of the combined orders to an earliest execution order (the position of order 4) among execution orders of the orders before being combined.

Subsequently, the queue management unit 13 determines an execution order with respect to all orders acquired from the queue 16 (S123).

Specifically, the queue management unit 13 searches for a combination of execution orders such that execution order reversal does not occur in an order group to which the same processing label has been assigned such that a total value E of differences between desired processing completion times and estimated processing completion times of respective orders (however, combined orders are handled as a single order) acquired from the queue 16 is maximized. That is, with respect to all standby orders, a delay of an estimated processing completion time with respect to a desired processing completion time of each order is calculated and a combination of execution orders is searched for such that execution order reversal does not occur in an order group to which the same processing label has been assigned such that the sum of delays of all orders is minimized. E is defined by mathematical expression (1).

[Formula 1]

$$E = \sum_{r=1}^{R} E_r \quad (1)$$

Here, R is a variable indicating the number of orders in the queue 16 and r is a variable (r≥0, r=0 represents execution in the control apparatus 30) indicating an execution order of orders in the queue 16. $E_r$ indicates a difference between a desired processing completion time and an estimated processing completion time of an r-th order and is defined by mathematical expression (2).

[Formula 2]

$$E_r = \begin{cases} RequestedTime(\text{Order}(r)) - T_r & (RequestedTime(\text{Order}(r)) < T_r) \\ 0 & (RequestedTime(\text{Order}(r)) \geq T_r) \end{cases} \quad (2)$$

Here, Order(r) is a function that represents an order with an execution order r, RequestedTime(o) is a function that represents a desired completion time of order o (a value assigned to the order), and $T_r$ is an estimated processing completion time of the order with the execution order r. When an estimated processing completion time is earlier than a desired completion time (a desire has been satisfied), an evaluated value is 0. On the other hand, when the estimated processing completion time is later than the desired processing completion time (a desire has not been satisfied), a delayed time is set as a negative evaluated value. $T_r$ is defined by mathematical expression (3).

[Formula 3]

$$T_r = \begin{cases} BeginTime(\text{Order}(r)) + EstimationTime(\text{Order}(r)) - \\ \quad CurrentTime() & (r = 0) \\ T_{r-1} + EstimationTime(\text{Order}(r)) & (r \geq 1) \end{cases} \quad (3)$$

Here, BeginTime(o) is a function that represents a processing start time of order o, EstimationTime(o) is a function that represents an estimated processing time of order o (a value assigned to the order), and CurrentTime( ) is a function that represents a current time. $T_o$ indicates an execution completion time of a currently executed order, and $T_r$ (r≥1) is calculated by adding an estimated processing time of an order with an execution order r to an estimated execution time of a previous order with an execution order r−1.

Figure 9:
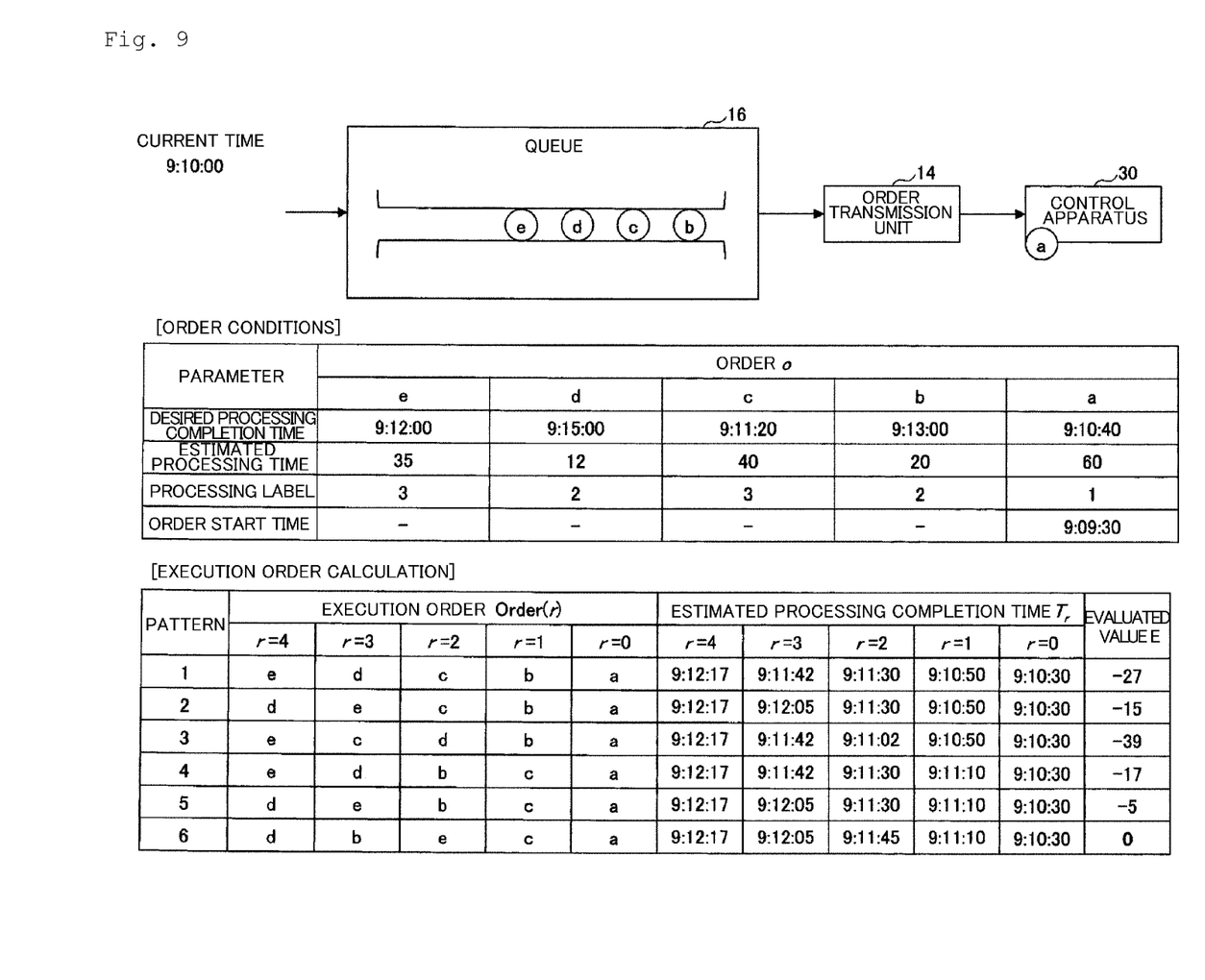
FIG. 9 is a diagram for describing an example of determination of an order execution order.

FIG. 9 is a diagram for describing an example of determination of an order execution order. FIG. 9 shows an example in which order a is being executed. and orders b, c, d and e are on standby in the queue 16. The current time is 9:10:00 and conditions of each. order are as described in the figure.

In determination of an execution order, when change of an execution order of orders having the same processing label is restricted. (order change of b=>d and c=>e is restricted in the example of FIG. 9), order execution order combination. patterns are a total of six patterns. The estimated processing completion time $T_r$ and the evaluated value E in each pattern are shown in the figure. In the case of FIG. 9, the queue management unit. 13 determines pattern 6 in which the evaluated value E is a maximum value as an execution order from a result of comparison of all patterns. Although an example in which combinations of execution orders are enumerated is shown here, searching within a short time can also be performed. by using a method of searching for a metaheuristic solution. of mathematical optimization (local search method, greedy method, GA, or the like) because the number of patterns is large when the number of orders in the queue 16 is large.

Subsequently, the queue management unit 13 operates orders in the queue 16 in which the order combination result and the execution order determination result will be reflected. in the queue 16 (S124). Consequently, turns of orders in the queue 16 are changed (S125).

[Order Allocation Processing]

When order processing is completed, the control apparatus 30 transmits processing results to the order request apparatus 20 (S131) and transmits the content of the order and the processing time of the corresponding order to the processing time storage unit 15 (S132). Consequently, the content and the processing time are associated and stored in the processing time storage unit 15 (S133). Subsequently, the control apparatus 30 transmits a processing completion. notification to the order transmission unit 14 (S134). The order transmission unit 14 acquires the order at the top of the queue 16 upon reception of the processing completion notification and transmits the order to the control apparatus 30. When processing with respect to the order is completed, step 5131 and subsequent steps are repeated.

Meanwhile, when orders for which processing is completed are combined. orders, the control apparatus 30 transmits processing results to the order request apparatus 20 for each order before being combined (each of orders 4, 6 and 9 in the example of FIG. 8) in step S131 and transmits a processing completion notification for each order before being combined in step S133.

As described above, according to the present embodiment, it is possible to increase a likelihood of restrictions with respect to a processing request (order) being satisfied.

Meanwhile, although an order with respect to a service in a virtualized network has been described as an example of a processing request in the present. embodiment, the present embodiment may be applied to other processing requests for which desired processing completion times are designated. For example, the present embodiment may be applied to execution requests for each job with respect to high-performance computers such as supercomputers.

Further, the order management apparatus 10 is an example of a processing request management apparatus in the present embodiment. The processing time estimation. unit 12 is an example of an estimation unit. The queue management unit 13 is an example of a determination unit and a combination unit. The order reception unit 11 is an example of a reception unit.

While the present embodiment has been described, the present invention is not limited to such a specific embodiment and various modifications and substitutions can be made without departing from the spirit or scope of the present invention.

REFERENCE SIGNS LIST

10 Order management apparatus
11 Order reception unit
12 Processing time estimation unit
13 Queue management unit
14 Order transmission unit
15 Processing time storage unit
16 Queue
20 Order request apparatus
30 Control apparatus
100 Drive device
101 Recording medium
102 Auxiliary storage device
103 Memory device
104 CPU
105 Interface device
B Bus

The invention claimed is:

1. A processing request management system comprising one or more processors configured to:
receive a plurality of processing requests, each request being designated a desired processing completion time;
estimate a time required for processing each of the plurality of processing requests;
for each execution order, included in multiple potential execution orders for processing the plurality of processing requests, determine a sum of delays for processing respective processing requests in the plurality of processing requests in the execution order,
wherein a delay for processing a processing request is determined based on i) the desired processing completion time for the processing request, and ii) an estimated processing completion time for the processing request in the execution order, that is determined using the estimated time required for processing the processing request;
determine a particular execution order of processing the plurality of processing requests such that the sum of delays for processing the plurality of processing requests in the particular execution order is minimized;
transmit a queue of the plurality of processing requests in the particular execution order for processing; and
execute the plurality of processing requests in the particular execution order.

2. The processing request management system according to claim 1, wherein the one or more processors are configured to receive the respective processing requests in turns and assign common identification information to a processing request group for which change of the turns is not permitted, and determine the particular execution order such that the turns are maintained in the processing request group to which the common identification information is assigned.

3. The processing request management system according to claim 1, wherein the one or more processors are configured to combine a set of processing requests for which a part of processing is common from among the plurality of processing requests into one, and to regard the combined processing requests as a single processing request and determine the particular execution order.

4. A processing request management method, performed by a computer, comprising:

receiving a plurality of processing requests, each request being designated a desired processing completion time;

estimating a time required for processing each of the plurality of processing requests;

for each execution order, included in multiple potential execution orders for processing the plurality of processing requests, determining a sum of delays for processing respective processing requests in the plurality of processing requests in the execution order, wherein a delay for processing a processing request is determined based on i) the desired processing completion time for the processing request, and ii) an estimated processing completion time for the processing request in the execution order, that is determined using the estimated time required for processing the processing request;

determining a particular execution order of processing the plurality of processing requests such that the sum of delays for processing the plurality of processing requests in the particular execution order is minimized;

transmitting a queue of the plurality of processing requests in the particular execution order for processing; and executing the plurality of processing requests in the particular execution order.

5. The processing request management method according to claim 4, further comprising:

receiving the respective processing requests in turns and assigning common identification information to a processing request group for which change of the turns is not permitted, and determining the particular execution order such that the turns are maintained in the processing request group to which the common identification information is assigned.

6. The processing request management method according to claim 4, further comprising:

combining a set of processing requests for which a part of processing is common from among the plurality of processing requests into one, and regarding the combined processing requests as a single processing request and determining the execution order.

7. A non-transitory computer-readable medium storing one or more instructions causing a computer to execute:

receiving a plurality of processing requests, each request being designated a desired processing completion time;

estimating a time required for processing each of the plurality of processing requests;

for each execution order, included in multiple potential execution orders for processing the plurality of processing requests, determining a sum of delays for processing respective processing requests in the plurality of processing requests in the execution order, wherein a delay for processing a processing request is determined based on i) the desired processing completion time for the processing request, and ii) an estimated processing completion time for the processing request in the execution order, that is determined using the estimated time required for processing the processing request;

determining a particular execution order of processing the plurality of processing requests such that the sum of delays for processing the plurality of processing requests in the particular execution order is minimized;

transmitting a queue of the plurality of processing requests in the particular execution order for processing; and executing the plurality of processing requests in the particular execution order.

8. The non-transitory computer-readable medium according to claim 7, wherein the one or more instructions further cause the computer to execute:

receiving the respective processing requests in turns and assigning common identification information to a processing request group for which change of the turns is not permitted, and determining the particular execution order such that the turns are maintained in the processing request group to which the common identification information is assigned.

9. The non-transitory computer-readable medium according to claim 7, wherein the one or more instructions further cause the computer to execute:

combining a set of processing requests for which a part of processing is common from among the plurality of processing requests into one, and regarding the combined processing requests as a single processing request and determining the execution order.

* * * * *